United States Patent
Goudey

(10) Patent No.: US 10,257,990 B1
(45) Date of Patent: Apr. 16, 2019

(54) GROWING MACROALGAE AT SEA

(71) Applicant: Clifford A. Goudey, Newburyport, MA (US)

(72) Inventor: Clifford A. Goudey, Newburyport, MA (US)

(*) Notice: Subject to any disclaimer, the term of this patent is extended or adjusted under 35 U.S.C. 154(b) by 0 days.

(21) Appl. No.: 15/829,376

(22) Filed: Dec. 1, 2017

Related U.S. Application Data

(60) Provisional application No. 62/429,154, filed on Dec. 2, 2016.

(51) Int. Cl.
*A01G 33/00* (2006.01)
*B63B 35/00* (2006.01)

(52) U.S. Cl.
CPC .............. *A01G 33/00* (2013.01); *B63B 35/00* (2013.01)

(58) Field of Classification Search
CPC ........ A01G 33/00; B63B 35/00; B63B 35/16; B63B 35/24; B63B 35/26; A01K 61/60; A01K 61/65; A01K 71/00; A01K 73/00; A01K 73/02; A01K 74/00; A01K 75/04
USPC .......................................................... 47/1.4
See application file for complete search history.

(56) References Cited

U.S. PATENT DOCUMENTS

| | | | | |
|---|---|---|---|---|
| 5,309,672 A | * | 5/1994 | Spencer ................. | A01G 33/00 47/1.4 |
| 2009/0193715 A1 | * | 8/2009 | Wilcox .................. | A01G 33/00 47/59 R |
| 2010/0154298 A1 | * | 6/2010 | Albus .................... | A01G 33/00 47/1.4 |
| 2010/0287829 A1 | * | 11/2010 | Bussell .................. | A01G 33/00 47/1.4 |

FOREIGN PATENT DOCUMENTS

| | | | | | |
|---|---|---|---|---|---|
| JP | 07327531 A | * | 12/1995 | | |
| JP | 08242716 A | * | 9/1996 | | |
| JP | 09191784 A | * | 7/1997 | | |
| JP | 10211897 A | * | 8/1998 | | |
| JP | 11089477 A | * | 4/1999 | | |
| JP | 2002315459 A | * | 10/2002 | | |
| JP | 2002330651 A | * | 11/2002 | | |
| JP | 2005040062 A | * | 2/2005 | | |
| JP | 2008220270 A | * | 9/2008 | | |
| WO | WO-2005082129 A1 | * | 9/2005 | ............. | A01G 33/00 |

* cited by examiner

*Primary Examiner* — Son T Nguyen

(74) *Attorney, Agent, or Firm* — Law Offices of Ira D. Blecker, P.C.

(57) ABSTRACT

The present invention provides a practical and economical means of growing of kelp and other types of macroalgae in large quantities on and in the ocean. Through the use of catenary principles and innovative structural designs, efficient designs emerge that translate into lightweight and low-cost components. The novel design described allows cost-efficient macroalgae farming at scales and at depths unsuitable for present macroalgae farming techniques. The device and methods described present a means of farming these seaweeds for the purpose of providing food, chemical feed stocks, and a biomass suitable for the production of biofuels.

18 Claims, 15 Drawing Sheets

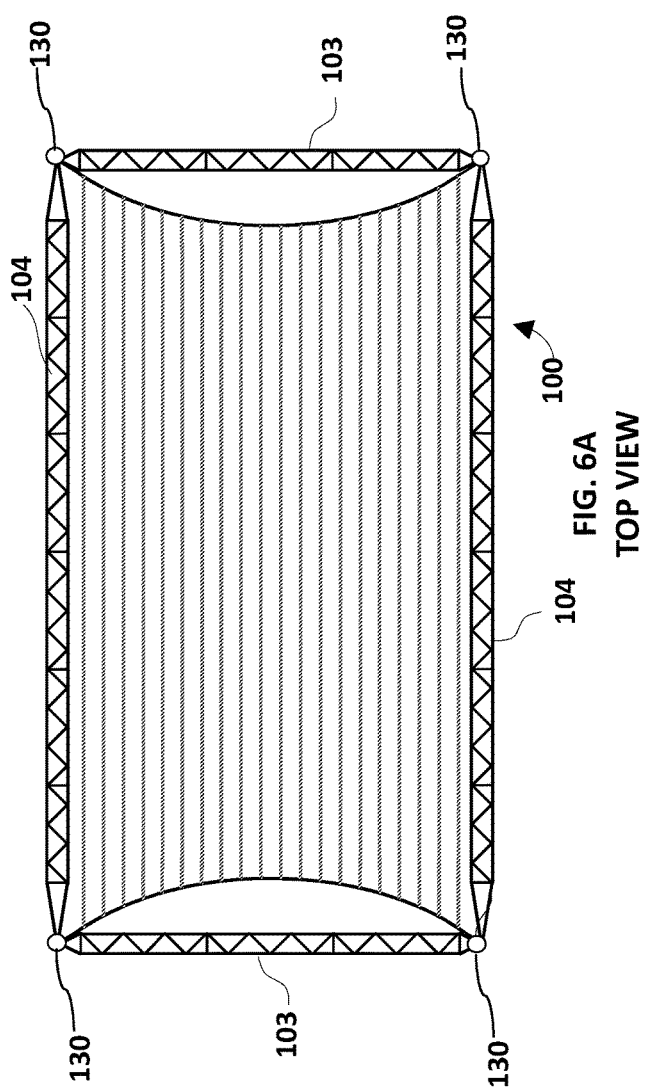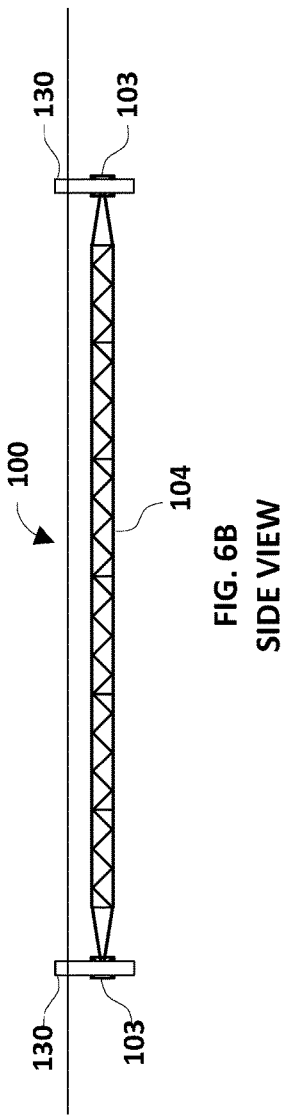
FIG. 6A
TOP VIEW
FIG. 6B
SIDE VIEW

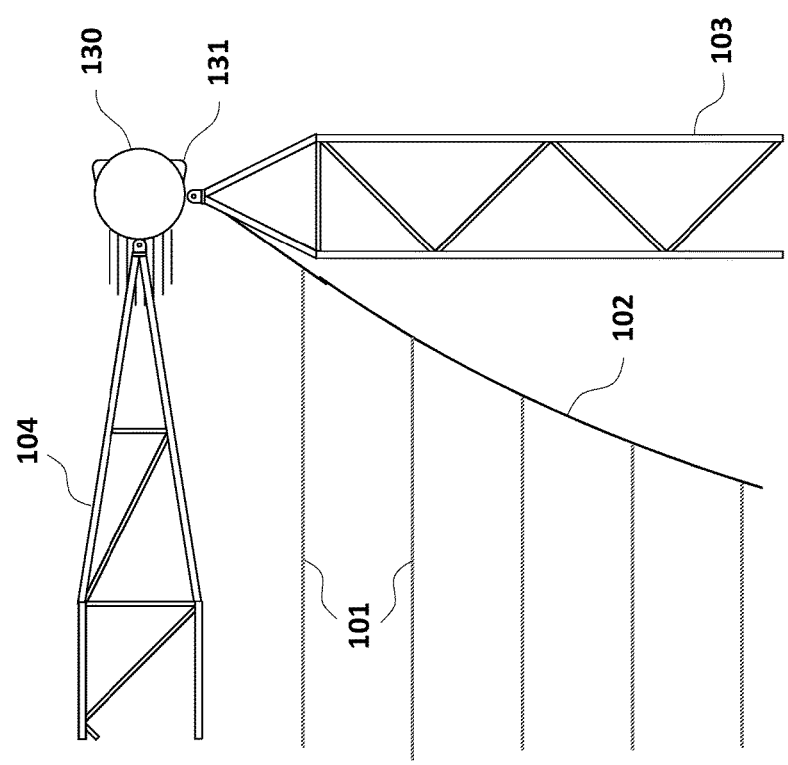

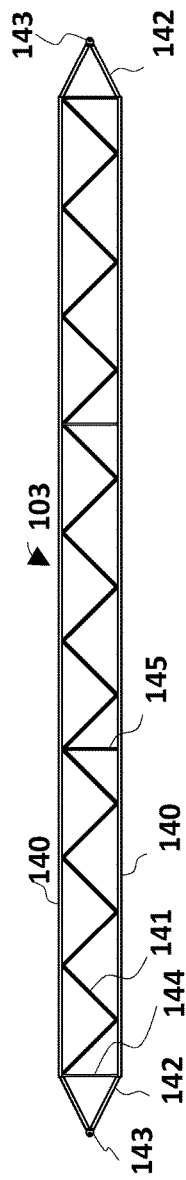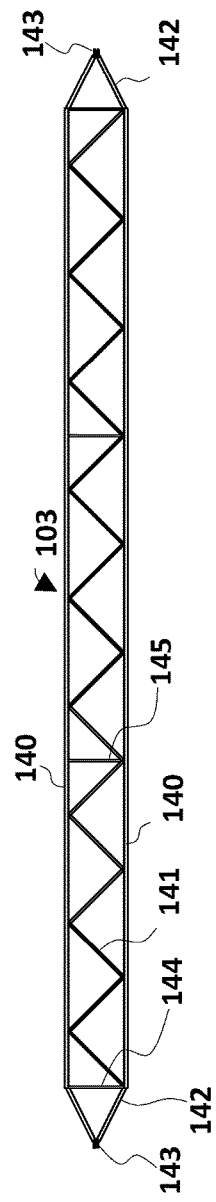
FIG. 9A
TOP VIEW
FIG. 9B
SIDE VIEW

GROWING MACROALGAE AT SEA

STATEMENT REGARDING FEDERALLY SPONSORED RESEARCH OR DEVELOPMENT

This invention was developed in part during the conduct of U.S. Department of Commerce NOAA Contract Number WC-133R-16-CN-0040, an SBIR Phase 1 project titled "Engineering Structures for Offshore Macroalgae Farming" and U.S. Department of Commerce NOAA Contract Number WC-133R-17-CN-0062, an SBIR Phase 2 project titled "Engineering Structures for Offshore Macroalgae Farming—Phase II."

TECHNICAL FIELD

The present invention relates to the growing of kelp and other types of macroalgae (collectively referred to as macroalgae) in large quantities on and in the ocean. The device and methods described present a means of farming these seaweeds for the purpose of providing food, chemical feed stocks, and a biomass suitable for the production of biofuels.

BACKGROUND OF THE INVENTION

As the fossil-fuel age draws to a close there will remain a substantial need for liquid fuels, so an increasing proportion of energy and products will have to come from biomass. At the same time, due to increased population and current food consumption trends, the world will need to produce 50-70% more food by 2050. Using conventional production techniques, these two paradigm shifts would require the increased use of land space for crops, which may be difficult given other land-use requirements. However, the oceans present a solution through the production of various seaweeds, or macroalgae, that can serve multiple purposes by both feeding humanity and powering civilization. Given the vastness of the oceans and the rapid growth rates of seaweeds, a significant portion of our food and energy needs could be met by farming the oceans.

However, present methods of macroalgae farming are suitable only in shallow waters where multiple, opposing anchors can be economically deployed to provide the structure needed for deploying longlines. Even in shallow water, the conventional practice of supporting individual longlines between two opposing anchors is an inefficient use of materials and of ocean space. These methods become unworkable at water depths deeper than found near shore, meaning that any growth in the sector would be confined to that narrow strip of ocean along the coasts where user conflicts are the highest. Marine macroalgae requires seawater, sunlight, and nutrients. Because of the limited depths to which sunlight can penetrate, most natural seaweed beds occur in shallow water over seabed substrates to which it can successfully attach. Present methods of seaweed farming involve the installation of suitable substrates such as ropes to which early-stage macroalgae can attach or are artificially attached. By placing this substrate at or close to the sea surface, useful growth can occur.

In order to realize profitable and efficient production of macroalgae biomass in the ocean technologies are needed to support their cultivation. The key challenge is to dramatically reduce capital and operating cost of macroalgae cultivation, while significantly increasing the range of deployment by expanding into more exposed, deep-water environments.

BRIEF SUMMARY OF THE INVENTION

The present invention offers advantages over present hardware and methods and enables the practical and economical deployment of macroalgae farms on the high seas.

The various advantages and purposes of the present invention in solving the problems described above and hereafter are achieved by providing, according to a first aspect of the invention, a structure that can support an array of longlines suitable for the culture of macroalgae.

According to a second aspect of the invention there is provided a structure that does not require a multitude of anchors and therefore can be deployed in deep water, opening up the vast areas of the world oceans to productive use in meeting humanities' food and energy needs.

According to a third aspect of the invention there is provided a structure that can be anchored using a single-point mooring or could be deployed in a drifting or self-propelled mode whereby the location of the macroalgae farm is predictably known due to ocean current and ocean gyre flows.

According to a fourth aspect of the invention there is provided a structure that is lightweight and modular that can be fabricated from low cost materials.

According to a fifth aspect of the invention there is provided a method of supporting closely spaced, parallel longlines with a minimal number of anchors using a curved line as a support system that ensures uniform tension in neighboring lines and therefore a reduced risk of contact or abrasion between them.

According to a sixth aspect of the invention there is provided a method of arranging a multiple arrays of longlines such that efficient use of ocean space is achieved with a reduced number of anchor lines.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description, which follows taken in conjunction with the accompanying drawings in which:

FIG. 6A represents a top view of a self-propelled macroalgae farm and FIG. 6B represents a side view of FIG. 6A.

FIG. 8 represents a detailed top view of the corner propulsion unit of FIG. 7.

FIG. 9A represents a top view of a detailed view of a rigid truss that may be used with macroalgae farms and FIG. 9B represents a side view of FIG. 9A.

DETAILED DESCRIPTION OF THE INVENTION

Figure 1:
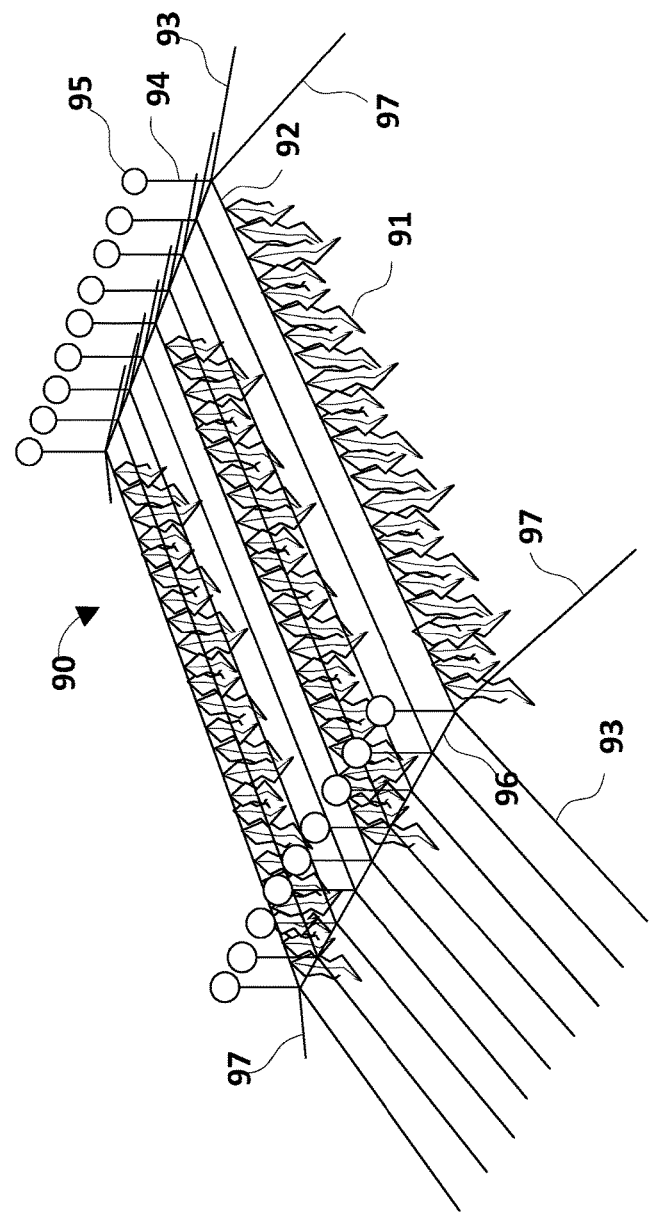
FIG. 1 represents a conventional shallow-water macroalgae farm.

Referring to the figures in more detail, and particularly referring to FIG. 1, there is shown an example of a conventional shallow-water macroalgae farm 90 where macroalgae 91 is grown on longlines 92 that are anchored at both ends using anchor lines 93 that lead outward and downward to an anchor (not shown) that is attached to the seabed (not shown). Each longline 92 is held taut by a buoy line 94 and buoy 95 that floats at the sea surface (not shown).

Longlines 92 are the preferred method of cultivating macroalgae 91 in the ocean. They are typically made of synthetic rope and are suspended below the surface of the ocean within range of sunlight.

This approach to macroalgae farming is suitable for shallow, protected waters. In this figure we see multiple, parallel longlines 92 in close proximity, each anchored and held taut as described above. In order to keep the multiple longlines 92 from contacting each other, sideways-tending anchor lines 97 can be used with intermediate connecting lines 96 added between each longline 92 at the intersection of the anchor line 93 and buoy line 94. Note that for clarity in this figure, macroalgae 91 is shown only growing on some of the longlines 92. Ordinarily, macroalgae 91 would be growing on all longlines 92.

This approach works well in shallow water but as the water depth increases, the length of the anchor lines 93 increase as well as the cost and complexity of installing each longline 92 due in part to the challenges of anchor placement in deep water. Furthermore, if the tension in each longline 92, anchor line 93 combination is not uniform, varying amounts of sag can result in contact between neighboring longlines 92 risking damage to the macroalgae 91 or the farm 90 components in general.

Figure 2:
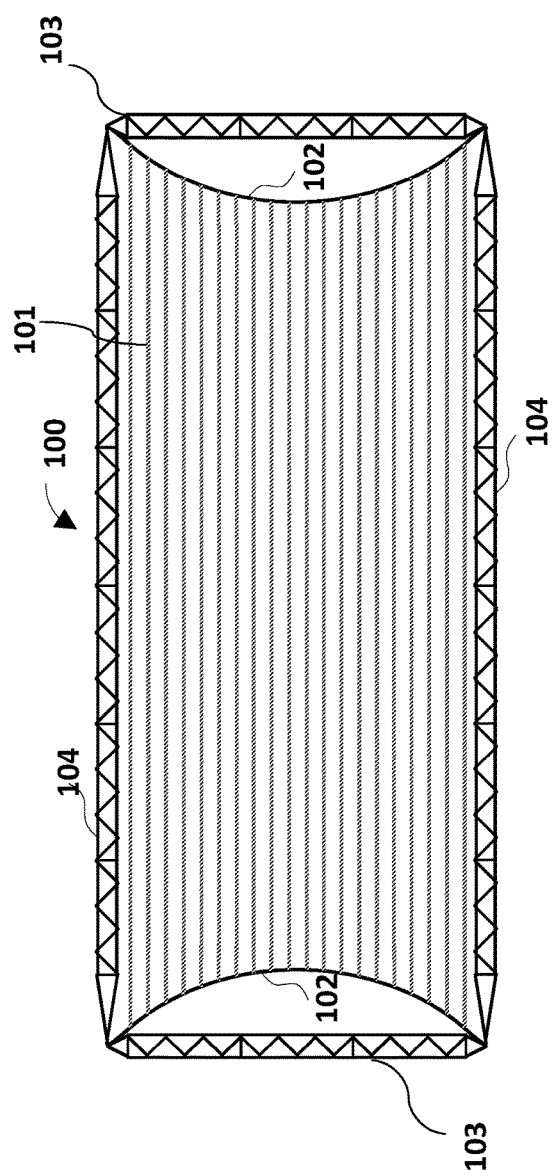
FIG. 2 represents a novel structure that supports the longlines of a macroalgae farm.

Referring now to FIG. 2, there is shown in an exemplary embodiment a novel structure 100 that supports the longlines 101 of a macroalgae farm 100. Each end of the many longlines 101 are connected to a catenary line 102 that is kept spread to its prescribed shape by a rigid transverse member 103. The two transverse members 103 are kept separated by two rigid longitudinal members 104. The rectangular configuration composed of rigid transverse members 103 and rigid longitudinal members 104 provide a four-sided structure that supports the flexible catenary lines 102 and flexible longlines 101.

A catenary line 102 is an arch-shaped line generally in the form of a parabola. Catenary lines 102 are preferred in this situation because they protect transverse member 103 from bending moments that would result if the longlines 101 were directly attached to the transverse member 103. As a result, the transverse member 103 may be lighter weight and less costly compared to one subjected to high levels of bending. In order to maintain uniform spacing between the longlines 101, the spacing of their attachment to the catenary line 102 must vary and increase as one progresses from the center of the macroalgae farm 100 to its outer edges.

Figure 3:
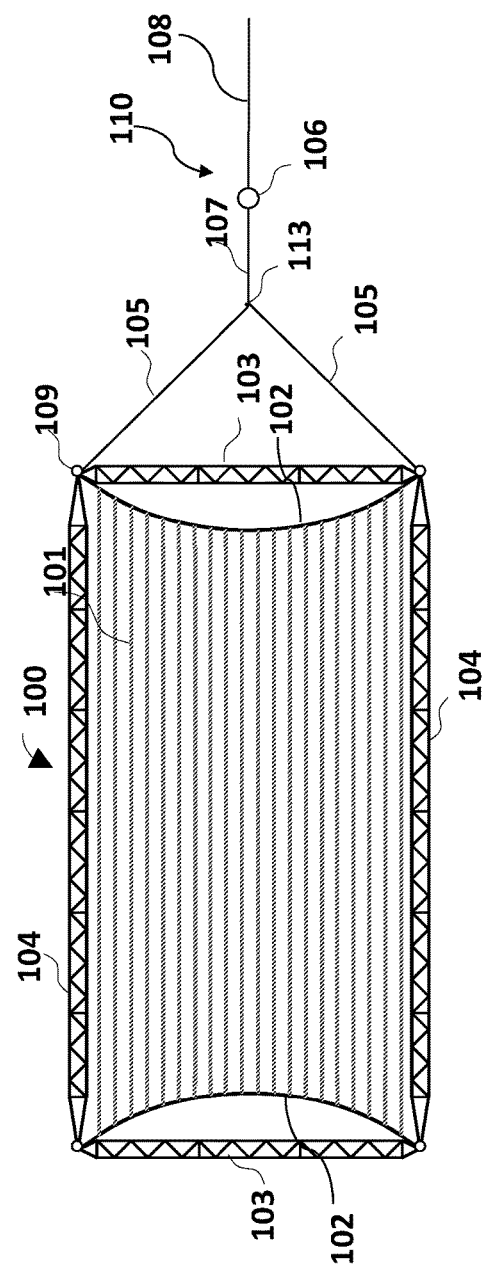
FIG. 3 represents a top view of the macroalgae farm of FIG. 2 anchored with a single-point mooring.

Referring now to FIG. 3, there is shown a top view of the macroalgae farm 100 of FIG. 2 anchored with a single-point mooring 110. The rectangular structure composed of rigid transverse members 103 and rigid longitudinal members 104 are connected to the single-point mooring 110 by a pair of mooring bridles 105. These mooring bridles 105 lead from the outer ends of the forward transverse member 103 to a mooring pendant 107 where it is connected by a shackle 113 or other connection means. The mooring pendant 107 is connected to the upper end of mooring line 108. Each corner of the macroalgae farm 100 is kept at or close to the sea surface by a surface float 109. The single point mooring 110 includes a mooring buoy 106 that supports the weight and vertical tension component of mooring line 108.

Figure 4:
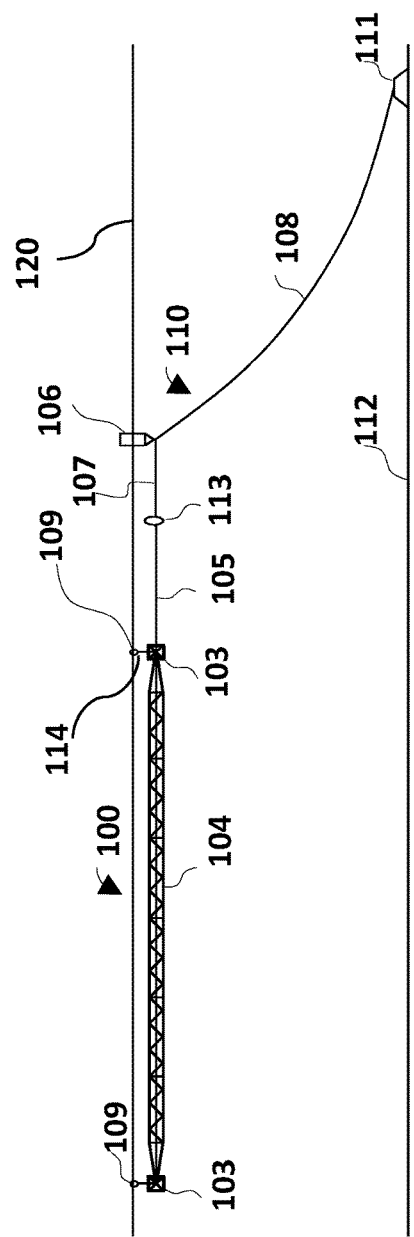
FIG. 4 represents a side view of the macroalgae farm of FIG. 2 anchored with a single-point mooring.

Referring now to FIG. 4, there is shown a side view of the macroalgae farm 100 of FIG. 3 anchored with a single-point mooring 110. The mooring bridles 105 lead from the outer ends of the forward transverse member 103 to a mooring pendant 107 where it is connected by a shackle 113 or other connection means. The mooring pendant 107 is connected to the upper end of mooring line 108, the lower end of which is connected to an anchor 111 that rests on, or is embedded in the seabed 112. Each corner of macroalgae farm structure 100 is kept at or close to the sea surface 120 by surface floats 109 that are connected to the ends of transverse members 103 by buoy line 114. The depth of the macroalgae farm 100 may be controlled by varying the length of buoy line 114. Also shown in FIG. 4 is a mooring buoy 106.

Figure 5:
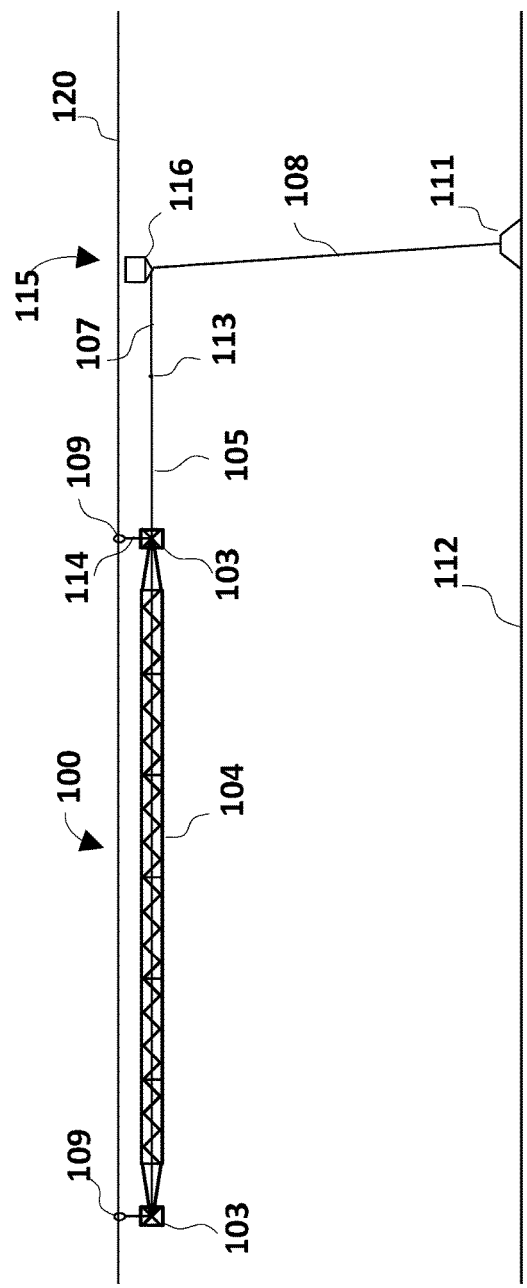
FIG. 5 represents a side view of the macroalgae farm of FIG. 2 anchored with a taut single-point mooring.

Referring now to FIG. 5, there is shown a side view of the macroalgae farm 100 anchored with a taut single-point mooring 115. The primary difference between this embodiment and that shown in FIG. 4 is that mooring line 108 is shorter and kept nearly vertical by a submerged mooring buoy 116. The required size of anchor 111 is increased to compensate for this greater vertical tension in mooring line 108 in this configuration. This taut configuration keeps the macroalgae farm 100 within a smaller watch circle and by adjusting the buoyancy of submerged mooring buoy 116, the depth of the mooring pendant 107 and in turn the depth of the mooring bridles 105 may be controlled and the entire macroalgae farm 100 may automatically be adjusted to a lower depth below in the event of higher currents and waves associated with storm events. The increased drag of the macroalgae farm 100 results in the tilting of mooring line 108 thereby decreasing its vertical extent resulting in the descent of mooring pendant 107 and mooring bridles 105 away from the sea surface 120. Because the surface floats 109 are small and offer limited reserve buoyancy, the entire macroalgae farm 100 will find equilibrium at a greater depth, thereby protecting itself from the more energetic conditions at the sea surface 120.

Referring now to FIGS. 6A and 6B, there is shown there is shown a top view (FIG. 6A) and a side view (FIG. 6B) of another exemplary embodiment of the macroalgae farm 100 that is modified to be self-propelled. In this embodiment, there is no permanent mooring and instead it is maneuvered or held in place by propulsion units 130 positioned at one or more, preferably at least two or more, of the corners of the self-propelled macroalgae farm structure 100.

Figure 7:
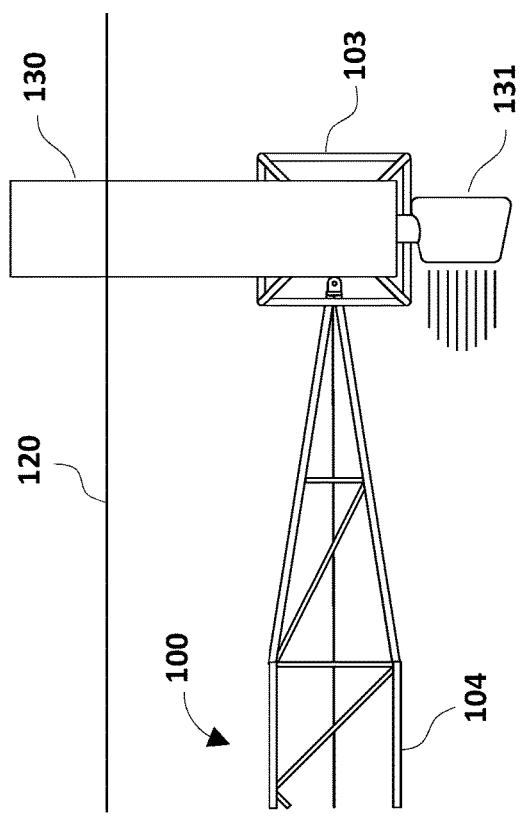
FIG. 7 represents a detailed side view of a corner propulsion unit in the macroalgae farm of FIGS. 6A and 6B.

Referring now to FIG. 7, there is shown a detailed side view of one of the corners of the self-propelled macroalgae farm 100 revealing a propulsion unit 130 which may form the intersection between rigid transverse members 103 and rigid longitudinal members 104. Propulsion unit 130, in one exemplary embodiment, is a vertical cylinder with a steerable thruster unit 131 protruding from its base. Propulsion unit 130 provides the needed buoyancy to keep the self-propelled macroalgae farm 100 properly positioned at the sea surface 120. Propulsion unit 130 is fitted with a power source and a means of sensing and control to enable the autonomous operation of the macroalgae farm 100 or its remote control from a manned location. The power source for propulsion unit 130 may be a diesel engine enclosed in the vertical cylinder and connected mechanically using a drive shaft or electrically using a generator and electric motor to the thruster unit 131. Its control system may include a suite of sensors such as a Global Positioning System, an autopilot, radar, and video connected to a navigation and control computer. The control computer may manage thruster power and steering and send telemeter information to shore via a direct radio link or through a satellite. Human operators ashore may similarly send control instructions to the on-board control computer to make course or position adjustments.

Referring now to FIG. 8, there is shown a detailed top view of one of the corners of the self-propelled macroalgae farm 100 revealing the propulsion unit 130 which forms the intersection between rigid transverse members 103 and rigid longitudinal members 104. Propulsion unit 130 is a vertical cylinder with a steerable thruster unit 131 protruding from its base. Also shown in this FIG. 8 is the catenary line 102 and several of the flexible longlines 101. A feature of the present invention is revealed in this FIG. 8. The hydrodynamic drag of the flexible longlines 101 is transferred to the catenary line 102 rather than being connected to rigid transverse members 103. This eliminates any resulting bending loads on rigid transverse members 103 due to those drag forces. The result is the drag of the flexible longlines 101, which can be substantial at the latter stages of macroalgae growth, does not need to be counteracted by bending strength in rigid transverse members 103. This means rigid transverse members 103 may be designed for nearly pure compression loads, resulting in a lightweight structure composed of slender components.

Referring now to FIGS. 9A and 9B, there is shown a top view (FIG. 9A) and side view (FIG. 9B) of rigid transverse member 103. This component is a four-sided truss structure and includes four longitudinal members 140 and multiple truss braces 141 that assemble to form a rigid structure in both planes of bending. At each end of rigid transverse members 103 there are four struts 142 that converge to a single attachment point 143. Also, at either end of the rigid transverse member 103 there are four box posts 144 that define the square cross section of this component. Also included are diagonals 145 that span across the square cross section of rigid transverse member 103 to maintain its square shape.

The combination of the rigid transverse members 103 and the rigid longitudinal members 104 being largely in pure compression that offers the functional advantages of this macroalgae farm 100. By avoiding internal bending loads these members may be kept lightweight and efficient. By utilizing an open truss framework as portrayed in FIGS. 9A and 9B, the structural members 103 and 104 may be comprised of slender structural elements that themselves offer low drag resistance to currents and waves.

The rigid transverse members 103 and the rigid longitudinal members 104 may be fabricated from hollow components such as circular or rectangular tubing in such a way that each individual component is nearly neutrally buoyant, meaning that when immersed in seawater the individual component tends to neither rise nor sink. This can be done by selecting a proper combination of outside dimensions and wall thickness, something that varies depending on the density of the material. If the totality of assembled truss members are neutrally buoyant when immersed in seawater or slightly negative, then there is little bending due to gravitational forces when in service which further allows the use of slender, lightweight components.

The material selection for macroalgae farm structure 100 may be varied depending on available materials and other service requirements. For example, rigid transverse members 103 and rigid longitudinal members 104 may be made of welded steel, welded aluminum, or composites. Similarly, the propulsion units 130 may be made of welded steel, welded aluminum, or composites. Catenary line 102 is best made of a high-modulus material such as wire rope, Dyneema® ultra-high molecular weight polyethylene fiber, or aramid fiber. The flexible longlines 101 would best be made of a fibrous material such as a synthetic rope of polyester or polypropylene or some combination of both that results in a neutrally buoyant line.

Figure 10:
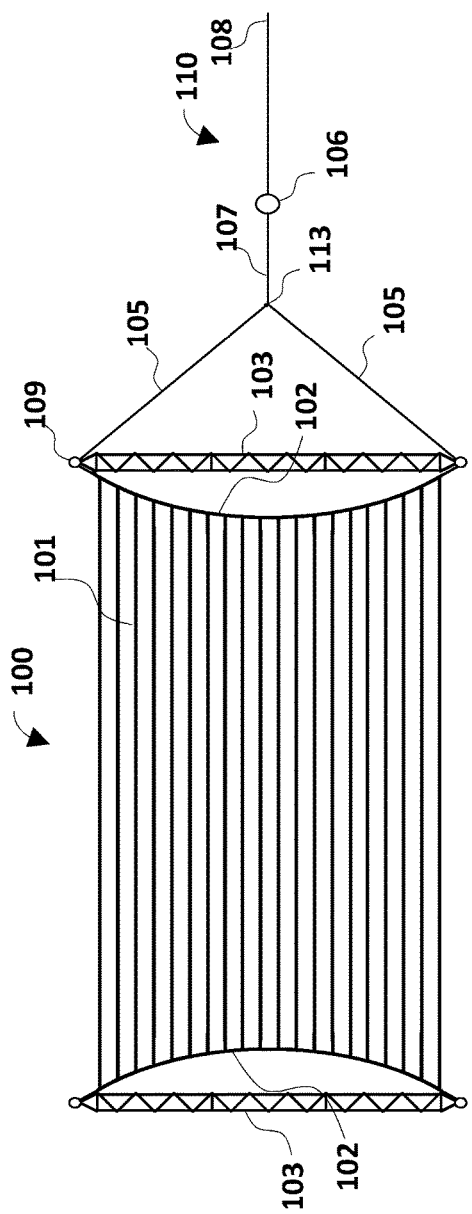
FIG. 10 represents a top view of a macroalgae farm without rigid longitudinal members.

Referring now to FIG. 10, there is shown a top view of another exemplary embodiment of macroalgae farm 100 that is modified to be without the two rigid longitudinal members 104 that are shown in FIG. 3 and other figures. In this embodiment, the overall shape of the structure is maintained by the tension generated by the flow of water through the modified macroalgae farm 100. Such a configuration might be feasible in a location where consistent ocean or tidal currents are sufficient and unceasing such as a location within the Gulf Stream.

Figure 11:
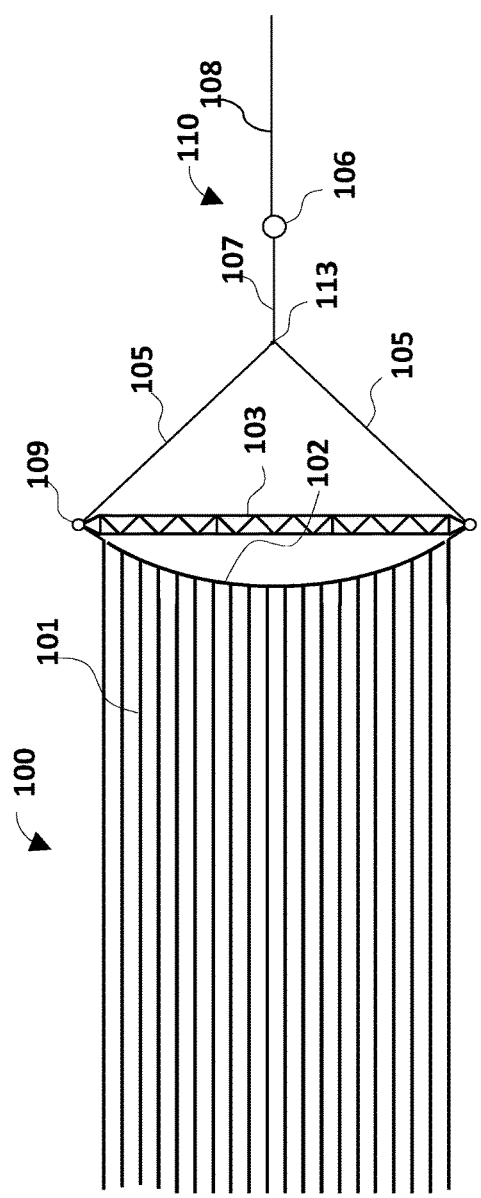
FIG. 11 represents a top view of a macroalgae farm without rigid longitudinal members and without a rear rigid transverse member.

Referring now to FIG. 11, there is shown a top view of another exemplary embodiment of macroalgae farm 100 that is modified to be without the two rigid longitudinal members 104 that are shown in FIG. 3 and other figures and also without the rear rigid transverse member 103 that is shown in FIG. 3 and other figures. As in FIG. 10, such a configuration might be feasible in a location where consistent ocean or tidal currents are sufficient and unceasing such as a location within the Gulf Stream.

Figure 12:
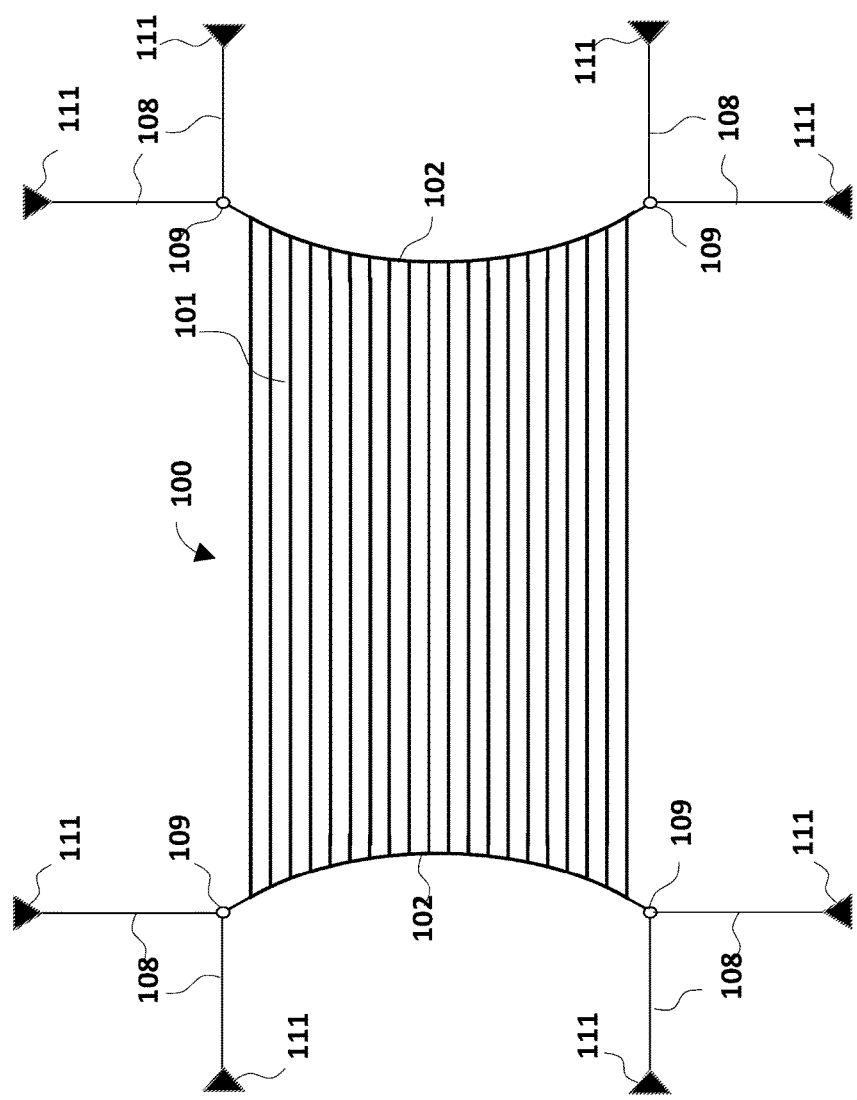
FIG. 12 represents a top view of a macroalgae farm without any rigid members that is supported by eight opposing anchors.

Referring now to FIG. 12, there is shown a top view of another exemplary embodiment of macroalgae farm 100 that is modified to be without any rigid members and that is supported by eight opposing anchors 111. The macroalgae farm 100 is comprised of multiple longlines 101 that are connected to a pair of catenary lines 102 that, in turn, are supported at each end by surface floats 109 and anchor lines 108. Each anchor line 108 leads from the end of catenary line 102 to an anchor 111. Surface floats 109 keep the macroalgae farm 100 at or close to the sea surface 120 while the anchor lines 108 provide the longitudinal and transverse tension forces to maintain the proper curvature of the catenary line 102 and the essential pre-tension in longlines 101.

The shape of catenary line 102, in the absence of the truss 103 shown in FIG. 11, is dependent on the relative tension in the two anchor lines 108 that attach to each end of catenary line 102 at a connection point under surface float 109. With relatively more tension in the sideways-tending anchors the catenary line 102 will assume a lesser amount of curvature. Conversely, with less tension in the sideways-tending anchors the catenary line 102 will have more curvature. If the tension in both anchor lines 108 are equal, then the ends of the catenary lines will assume an angle of 45 degrees.

Achieving a desirable configuration where the longlines 101 exhibit uniform tension requires a methodical specification of the relative lengths of longlines 101, a specification for the length of anchor lines 108, and a careful placement of anchors 111 during deployment. The calculations of these geometric parameters relies on the mathematical equations for a parabola. As noted previously, in order to maintain uniform spacing between the longlines 101 the spacing of their attachment to the catenary line 102 must vary as one progresses from the center of the array 100 to its outer edges.

It should also be noted that the longlines 101 may be composed of three parts, namely, a center section of uniform length, and two end portions that account for the total difference in length from the center of the array to its outer edges. In this way, removable portions of the longlines 101 may be utilized with the outer portion more permanently attached to the catenary line 102.

Figure 13:
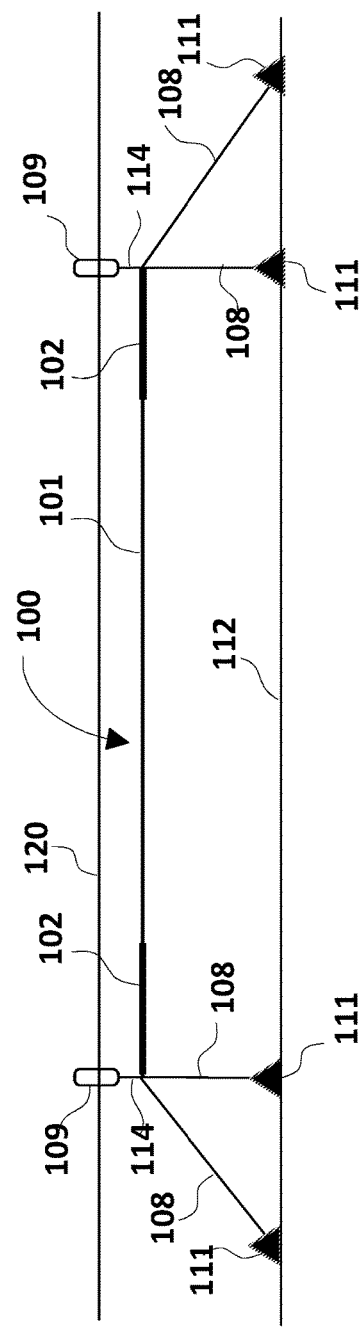
FIG. 13 represents a side view of the macroalgae farm of FIG. 12 without any rigid members that is supported by eight opposing anchors.

Referring now to FIG. 13, there is shown a side view of the macroalgae farm 100 previously shown in FIG. 12. In this view the vertical arrangement of the macroalgae farm 100 is revealed with the longlines 101 and catenary line 102 forming a planar surface at a prescribed depth below the sea surface 120 by the surface float 109 and a buoy line 114 running between the bottom of surface floats 109 and the intersection of mooring lines 108 and catenary line 102. The depth of the macroalgae farm 100, and the longlines 101 in particular, is controlled by the lengths of buoy line 114, which may be made of rope, chain, or other appropriate material. Anchors 111 may be of any suitable type such as deadweight, drag-embedment, or helical screw-in type.

In the arrangement shown in FIG. 13, the size of the surface floats 109 preferably are sufficient to overcome the vertical component of the tension in the mooring lines 108 which is a combination of any pretension applied to the macroalgae farm 100 during installation and additional tension due to the hydrodynamic drag of the components of macroalgae farm 100 and any macroalgae that is growing on longlines 101.

Figure 14:
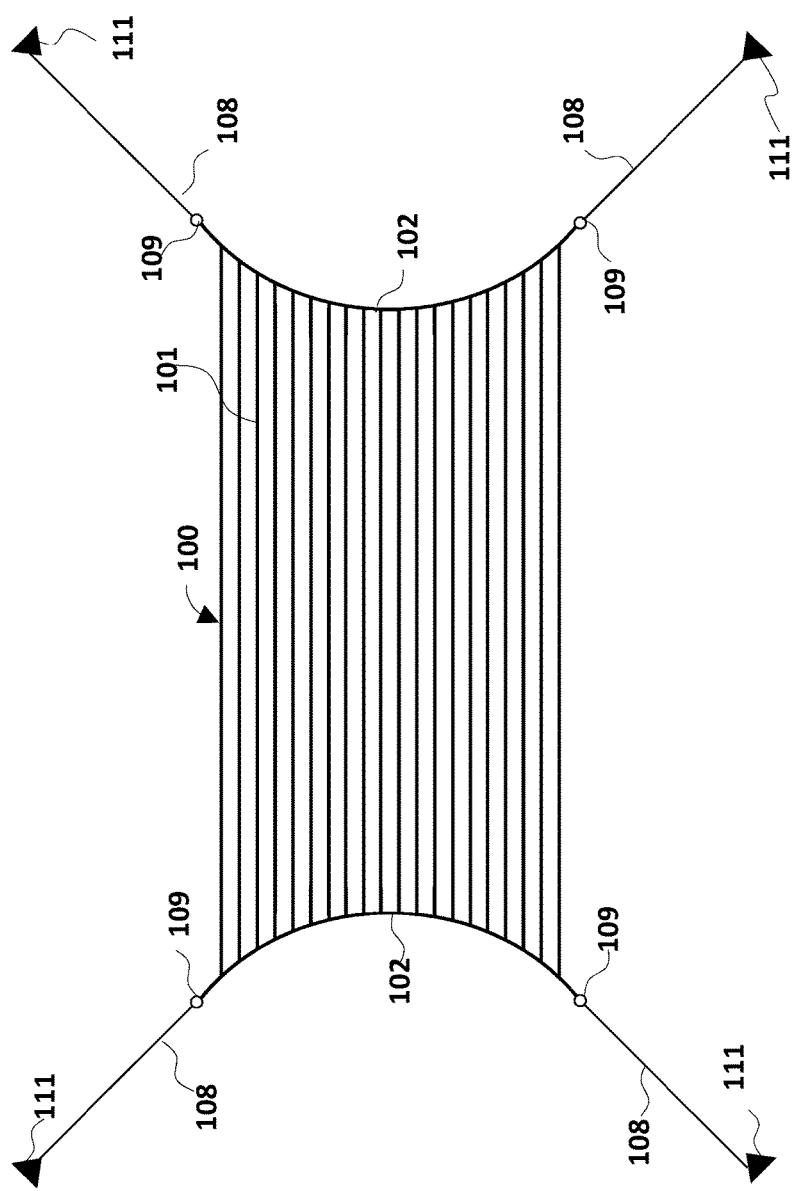
FIG. 14 represents a top view of a macroalgae farm without any rigid members that is supported by four opposing anchors.

Referring now to FIG. 14, there is shown a top view of another exemplary embodiment of macroalgae farm 100 that is modified to be without any rigid members and that is supported by four opposing anchors. The macroalgae farm 100 is comprised of multiple longlines 101 that are connected to a pair of catenary lines 102 that, in turn, are supported at each end by surface float 109 and anchor lines 108. Each anchor line 108 leads from the end of catenary line 102 to an anchor 111. The surface float 109 keep the farm array 100 at or close to the sea surface 120 (not shown in this FIG. 14) while the anchor lines 108 provide the tension forces needed to maintain the proper curvature of the catenary line 102 and the essential pre-tension in longlines 101. The azimuth angle of the anchor line 108 relative to the longitudinal direction of the longlines 101 is determined by the angle taken by the outer ends of the catenary line 102. This angle is typically 45 degrees to the longitudinal direction but can vary from 30 degrees to 60 degrees depending on the circumstances and the preferences of the farm array 100 operator. In one exemplary embodiment, the anchor lines extend outwardly from the catenary lines 102 in a direction so as to essentially extend the curvature of the catenary lines 102.

Figure 15:
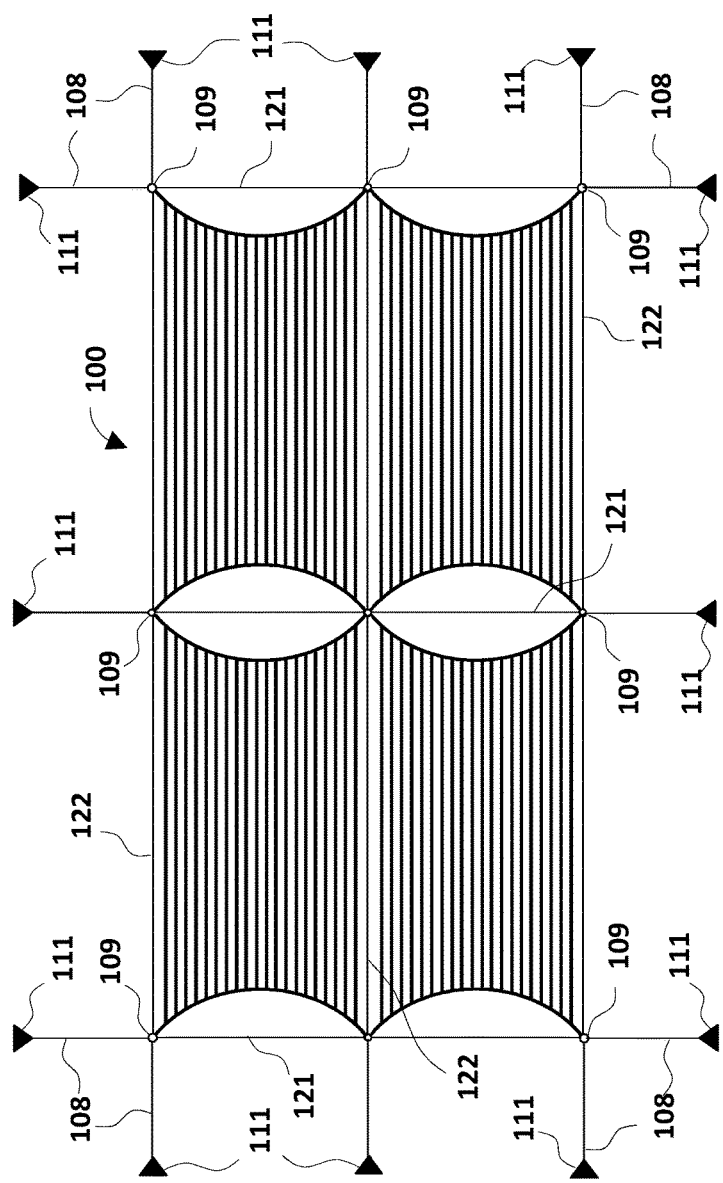
FIG. 15 represents a top view of a macroalgae farm that is composed of multiple longline groupings that is arranged to provide a high ratio of growing area compared to the number of anchors required.

Referring now to FIG. 15, there is shown a top view of another exemplary embodiment of the macroalgae farm 100 that is composed of multiple macroalgae farms 100 interconnected lengthwise and widthwise in a way that longitudinal and transverse tension is maintained through a more efficient use of mooring lines 108 and anchors 111. In comparison to FIG. 12 where one farm array 100 is supported by eight mooring lines 108 and eight anchors 111, the exemplary embodiment of FIG. 15 illustrates two-by-two arrangement of four macroalgae farms 100 supported by twelve mooring lines 108 and twelve anchors 111. This arrangement also includes longitudinal farming lines 122 and transverse framing lines 121 that maintain the rectilinear shape of the arrangement even if one or more macroalgae farms 100 are removed.

The exemplary embodiment of FIG. 15 provides a high ratio of growing area compared to the number of anchors required. For example a three-by-three grouping of nine macroalgae farms 100 may be supported by sixteen mooring lines 108 and sixteen anchors 111. Similarly, a four-by-four grouping of sixteen macroalgae farms 100 may be supported by twenty mooring lines 108 and twenty anchors 111. Once this method of arranging macroalgae farms 100 reaches a five-by-five grouping, there are fewer mooring lines 108 and anchors 111 than there are farm arrays 100. This approach greatly improves the material efficiency and cost effectiveness of macroalgae farming.

It will be apparent to those skilled in the art having regard to this disclosure that other modifications of this invention beyond those embodiments specifically described here may be made without departing from the spirit of the invention. For example, rigid transverse members 103 and rigid longitudinal members 104 could be replaced with simple tubular elements that provide the desired strength and rigidity without the complexity of the truss configuration. Furthermore, the multi-array arrangement does not need to have an equal number of transverse and longitudinal arrays. Accordingly, such modifications are considered within the scope of the invention.

What is claimed is:

1. An apparatus for farming macroalgae in a body of water, comprising:
    longlines for supporting a growth of macroalgae;
    a catenary line positioned such that one end of each longline is joined to the catenary line wherein the catenary line has the form of a parabola, the catenary line having two ends and the longlines closest to each end each being longer than the longlines closer to a center of the catenary line;
    a structure connected to the ends of the catenary line to keep the catenary line taut, the structure comprising a rigid transverse structure connected only to each end of the catenary line and extending without interruption between each end of the catenary line;
    a second catenary line positioned at opposite ends of the longlines from the catenary line, wherein the second catenary line has the form of a parabola, the second catenary line having two ends;
    a second structure connected to the second catenary line to keep the second catenary line taut, the second structure comprising a second rigid transverse structure connected only to each end of the second catenary line and extending without interruption between each end of the catenary line;
    a plurality of floats connected to the structure and the second structure to keep the apparatus from sinking;
    mooring lines connected to each end of at least one of the structure and the second structure; and an anchor connected to the mooring lines;
wherein the mooring lines connected to the anchor, the catenary line connected to the structure and the second catenary line connected to the second structure provide a support system that ensures uniform tension in neighboring longlines and the parabolic shape of the catenary line and the second catenary line.

2. The apparatus of claim 1 further comprising:
first and second rigid longitudinal structures positioned between ends of the rigid transverse structure and the second rigid transverse structure to keep the rigid transverse structure and the second rigid transverse structure separated.

3. The apparatus of claim 1 wherein there is a plurality of propulsion units such that each propulsion unit is connected to the rigid transverse structure or the second rigid transverse structure.

4. The apparatus of claim 1 wherein the length of each longline is precisely specified such that the catenary line and second catenary line each achieves a parabolic shape to ensure uniform tension of all of the longlines.

5. The apparatus of claim 1 wherein one or more floats of the plurality of floats is positioned at an end of the structure and an end of the second structure.

6. An apparatus for farming macroalgae in a body of water comprising:
longlines for supporting a growth of macroalgae;
a catenary line positioned such that one end of each longline is joined to the catenary line that has the form of a parabola, the catenary line having two ends and the longlines closest to each end each being longer than the longlines closer to a center of the catenary line;
a second catenary line positioned such that a second end of each longline is joined to the second catenary line that has the form of a parabola, the second catenary line having two ends and the longlines closest to each end each being longer than the longlines closer to a center of the catenary line;
a mooring line connected to each end of the catenary line and each end of the second catenary line, each of the mooring lines connected to an anchor in contact with a seabed such that the mooring lines and anchors are sufficient to keep the apparatus within a predetermined area and such that the mooring lines and anchors provide longitudinal and transverse tension forces to maintain the proper curvature of the catenary line and the second catenary line, a pre-tension in the longlines and a uniform spacing between the longlines.

7. The apparatus of claim 6 wherein the mooring lines extend outwardly from the catenary line and the second catenary line along a straight line that is parallel to a curvature of the catenary line at the ends of the catenary line and parallel to a curvature of the second catenary line at the ends of the second catenary line.

8. The apparatus of claim 6 wherein the longlines, catenary line and second catenary line define a macroalgae farm and further comprising at least one additional macroalgae farm connected to the macroalgae farm.

9. The apparatus of claim 6 wherein the length of each longline is precisely specified such that the catenary line and second catenary line each achieves a parabolic shape to ensure uniform tension of all of the longlines.

10. The apparatus of claim 6 wherein the spacing between the longlines is held constant by precisely specifying the distance between each attachment point on the catenary line and the second catenary line using mathematical equations for a parabola.

11. The apparatus of claim 6 further comprising a plurality of floats connected to the two ends of the catenary line and the two ends of the second catenary line to keep the apparatus from sinking.

12. An apparatus for farming macroalgae in a body of water, comprising:
a plurality of longlines for supporting a growth of macroalgae, the longlines being evenly spaced with respect to adjacent longlines;
a catenary line positioned such that one end of each longline is joined to the catenary line wherein the catenary line has the form of a parabola having a center and two ends, the spacing of the longlines along the catenary line at the join with the catenary line being at a minimum at the center of the catenary line and increasing to a maximum at an outer point on the catenary line where the last longline closest to each end joins with the catenary line, the longlines closest to each end each being longer than the longlines closer to the center of the parabola;
a second catenary line positioned such that a second end of each longline is joined to the second catenary line wherein the second catenary line has the form of a parabola having a center and two ends, the spacing of the longlines along the second catenary line at the join with the second catenary line being at a minimum at the center of the second catenary line and increasing to a maximum at an outer point on the second catenary line where the last longline closest to each end joins with the second catenary line, the longlines closest to each end each being longer than the longlines closer to the center of the parabola;
a structure connected to each end of the catenary line and each end of the second catenary end to keep the catenary line and the second catenary line taut such that the structures provide longitudinal and transverse tension forces to maintain the proper curvature of the catenary line and the second catenary line, a pre-tension in the longlines and a uniform spacing between the longlines; and
a plurality of floats connected to the catenary line and the second catenary line to keep the apparatus from sinking.

13. The apparatus of claim 12 wherein the structures comprising a mooring line connected to each end of the catenary line and the second catenary line, the mooring lines each connected to an anchor in contact with a seabed such that the mooring line and anchor are sufficient to keep the apparatus within a predetermined area.

14. The apparatus of claim 13 wherein the mooring lines extend outwardly from the catenary line and the second catenary line along a straight line that is parallel to a curvature of the catenary line at the ends of the catenary line and parallel to a curvature of the second catenary line at the ends of the second catenary line.

15. The apparatus of claim 12 wherein the length of each longline is precisely specified such that the catenary line and second catenary line each achieves a parabolic shape to ensure uniform tension of all of the longlines.

16. The apparatus of claim 12 wherein the spacing between the longlines is held constant by precisely specifying the distance between each attachment point on the catenary line and the second catenary line using mathematical equations for a parabola.

17. The apparatus of claim 12 wherein the plurality of floats are positioned at the ends of the catenary line and at the ends of the second catenary line.

18. The apparatus of claim 12 wherein the longlines, catenary line and second catenary line and plurality of floats define a macroalgae farm and further comprising at least one additional macroalgae farm connected to the macroalgae farm.

\* \* \* \* \*